United States Patent
Chiang

(10) Patent No.: US 7,557,737 B2
(45) Date of Patent: Jul. 7, 2009

(54) WIRELESS CURSOR CONTROL DEVICE

(75) Inventor: Hsiao-Lung Chiang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 337 days.

(21) Appl. No.: 11/365,783

(22) Filed: Mar. 1, 2006

(65) Prior Publication Data

US 2007/0132730 A1   Jun. 14, 2007

(30) Foreign Application Priority Data

Dec. 9, 2005   (TW)   .............................. 94143528 A

(51) Int. Cl.
*H03M 11/00*   (2006.01)
(52) U.S. Cl. .................. 341/20; 345/163; 345/169; 710/62
(58) Field of Classification Search .................. 341/20, 341/22; 710/62, 1, 64, 303, 105; 345/163, 345/169; 455/557, 88
See application file for complete search history.

(56) References Cited

U.S. PATENT DOCUMENTS

| | | | |
|---|---|---|---|
| 6,590,563 B1 * | 7/2003 | Oross et al. ................. | 345/163 |
| 6,801,967 B2 * | 10/2004 | Nakamura et al. ............ | 710/62 |
| 6,909,421 B2 * | 6/2005 | Wang ......................... | 345/163 |
| 2006/0007151 A1 * | 1/2006 | Ram ........................... | 345/163 |
| 2008/0001922 A1 * | 1/2008 | Johnson et al. ............. | 345/166 |

* cited by examiner

*Primary Examiner*—Brian A Zimmerman
*Assistant Examiner*—Hung Q Dang
(74) *Attorney, Agent, or Firm*—Apex Juris, pllc; Tracy M Heims

(57) ABSTRACT

A wireless cursor control device for use with a computer system includes a main body, a wireless signal receiver, a storing portion and a supporting member. The main body generates a wireless signal to control a cursor of the computer system. The wireless signal receiver is swappable to be electrically connected to the computer system for receiving the wireless signal. The storing portion is disposed in the main body for accommodating the wireless signal receiver. The storing portion includes a first indentation structure and a second indentation structure in the bilateral side thereof. The supporting member has a first part and a second part to be respectively engaged with the first indentation structure and the second indentation structure according to a restoring force per se, and includes a first protrusion structure and a second protrusion structure to be sustained against the wireless signal receiver.

7 Claims, 6 Drawing Sheets

WIRELESS CURSOR CONTROL DEVICE

FIELD OF THE INVENTION

The present invention relates to a wireless cursor control device, and more particularly to a wireless cursor control device for use with a computer system.

BACKGROUND OF THE INVENTION

Personal computers and notebook computers become essential data processing devise in the work places or homes. Nowadays, wireless communication technologies have experienced great growth and are rapidly gaining in popularity. As known, when the wired peripheral device is used, the wire linkage is very troublesome and inconvenient because an additional signal wire is employed to connect the computer with the peripheral device. In comparison with the wired peripheral technology, the wireless peripheral device is very user-friendly. An example of the wireless peripheral device includes a wireless mouse, a wireless keyboard, a wireless network camera, etc. Among these wireless peripheral devices, the wireless mouse and the wireless keyboard are popularly served as input devices in the industry.

Take a wireless mouse for example. Instead of using the signal wire, when the wireless mouse is operated, a corresponding wireless signal receiver is used for receiving the wireless signal issued from the wireless mouse. The wireless signal receiver is connected to the universal serial bus (USB) port of the host computer. Therefore, the signals generated from the wireless mouse can be transmitted to the host computer via the wireless receiver. Although this wireless mouse is convenient because no signal wire is required, this wireless mouse still has several drawbacks. For example, when the wireless mouse is operated, a corresponding wireless signal receiver is necessary. In a case that this wireless mouse is used in other places, the user should carry the corresponding wireless receiver at the same time. In other words, if the wireless mouse and the wireless receiver are separately stored, the probability of losing either the wireless mouse or the wireless signal receiver is increased. Under this circumstance, the wireless mouse fails to be normally operated.

For a purpose of solving such a problem, a storing structure of a wireless signal receiver is disclosed in Taiwanese Patent No. M270432, and the contents of which are hereby incorporated by reference. Referring to FIG. 1, the storing structure disclosed in Taiwanese Patent No. M270432 is illustrated. The wireless mouse 1 is stored within a storing portion 11 in the bottom surface thereof. The wireless signal receiver 2 for use with the wireless mouse 1 comprises a handle portion 21 corresponding to an indentation structure 21 in the vicinity of the outlet of the storing portion 11. The handle portion 21 may facilitate the user to withdraw the wireless signal receiver 2 from the storing portion 11 of the wireless mouse 1. For storing the wireless signal receiver 2, the wireless signal receiver 2 is interference fitted into the storing portion 11 of the wireless mouse 1. In other words, the dimension of the wireless signal receiver 2 considerably conforms to the storing portion 11. Since the friction forces between the wireless signal receiver 2 and the storing portion 11 are balanced, the wireless signal receiver 2 can be firmly secured within the storing portion 11 of the wireless mouse 1 so as to effectively store the wireless signal receiver 2. Unfortunately, if the process of removing/inserting the wireless signal receiver 2 from/into the storing portion 11 of the wireless mouse 1 is repeatedly done for a long term, the wireless signal receiver 2 may no longer be interference fitted into the storing portion 11 of the wireless mouse 1. As a consequence, the wireless signal receiver 2 is likely to loosen or fall off because the wireless signal receiver 2 is not firmly secured within the storing portion 11 of the wireless mouse 1. Under this circumstance, the storing device of the wireless mouse is troublesome and not user-friendly.

In views of the above-described disadvantages resulted from the prior art, the applicant keeps on carving unflaggingly to develop a wireless cursor control device according to the present invention through wholehearted experience and research.

SUMMARY OF THE INVENTION

It is an object of the present invention to provide a wireless cursor control device for use with a computer system.

In accordance with an aspect of the present invention, the wireless cursor control device comprises a main body, a wireless signal receiver, a storing portion and a supporting member. The main body generates a wireless signal to control a cursor of the computer system. The wireless signal receiver is swappable to be electrically connected to the computer system for receiving the wireless signal. The storing portion is disposed in the main body for accommodating the wireless signal receiver. The storing portion comprises a first indentation structure and a second indentation structure in the bilateral side thereof. The supporting member has a first part and a second part to be respectively engaged with the first indentation structure and the second indentation structure according to a restoring force per se, and comprises a first protrusion structure and a second protrusion structure to be sustained against the wireless signal receiver.

In an embodiment, the main body is a main body of a wireless mouse, and the computer system is selected from one of a personal computer and a notebook computer.

In an embodiment, the wireless signal receiver is swappable to be electrically connected to the computer system via a universal serial bus port.

In an embodiment, the wireless signal receiver further comprises a first notch and a second notch to be engaged with the first protrusion structure and the second protrusion structure of the supporting member.

In an embodiment, the storing portion further comprises a third indentation structure and a roof structure above the third indentation structure for facilitating positioning the wireless signal receiver within the storing portion.

In an embodiment, the supporting member further comprises a third protrusion structure to be engaged with the third indentation structure when the first part and the second part of the supporting member are engaged with the first indentation structure and the second indentation structure, respectively.

In an embodiment, the supporting member is a resilient supporting rod produced from stainless steel, so that the first part and the second part of the resilient supporting rod are respectively engaged with the first indentation structure and the second indentation structure according to a restoring force per se.

In an embodiment, the wireless signal receiver is stored within the storing portion by a depressing approach and the first protrusion structure and the second protrusion structure of the supporting member are sustained against the wireless signal receiver after the supporting member is engaged within the storing portion. The length of the storing portion is slightly greater than that of the wireless signal receiver. A remaining space generated when the wireless signal receiver is stored within the storing portion facilitates a user to withdraw the wireless signal receiver from the storing portion."

In an embodiment, the storing portion has an inclined plane and the length of the storing portion is slightly greater than that of the wireless signal receiver, so that the wireless signal receiver is slidable to be stored within the storing portion and the first protrusion structure and the second protrusion structure of the supporting member are sustained against the wireless signal receiver.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
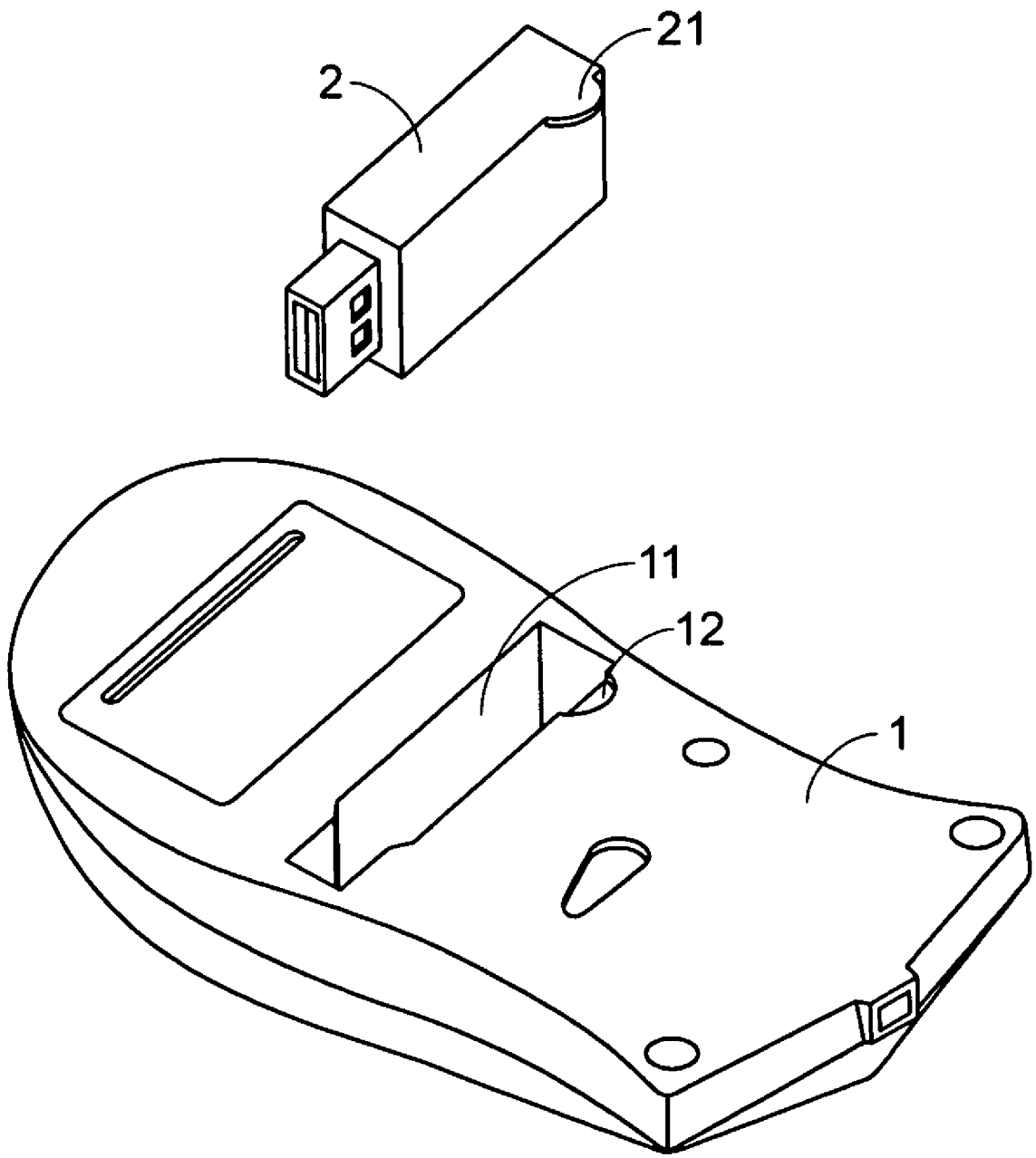
FIG. 1 is a schematic view of a wireless mouse having a storing structure according to prior art.
Figure 2A:
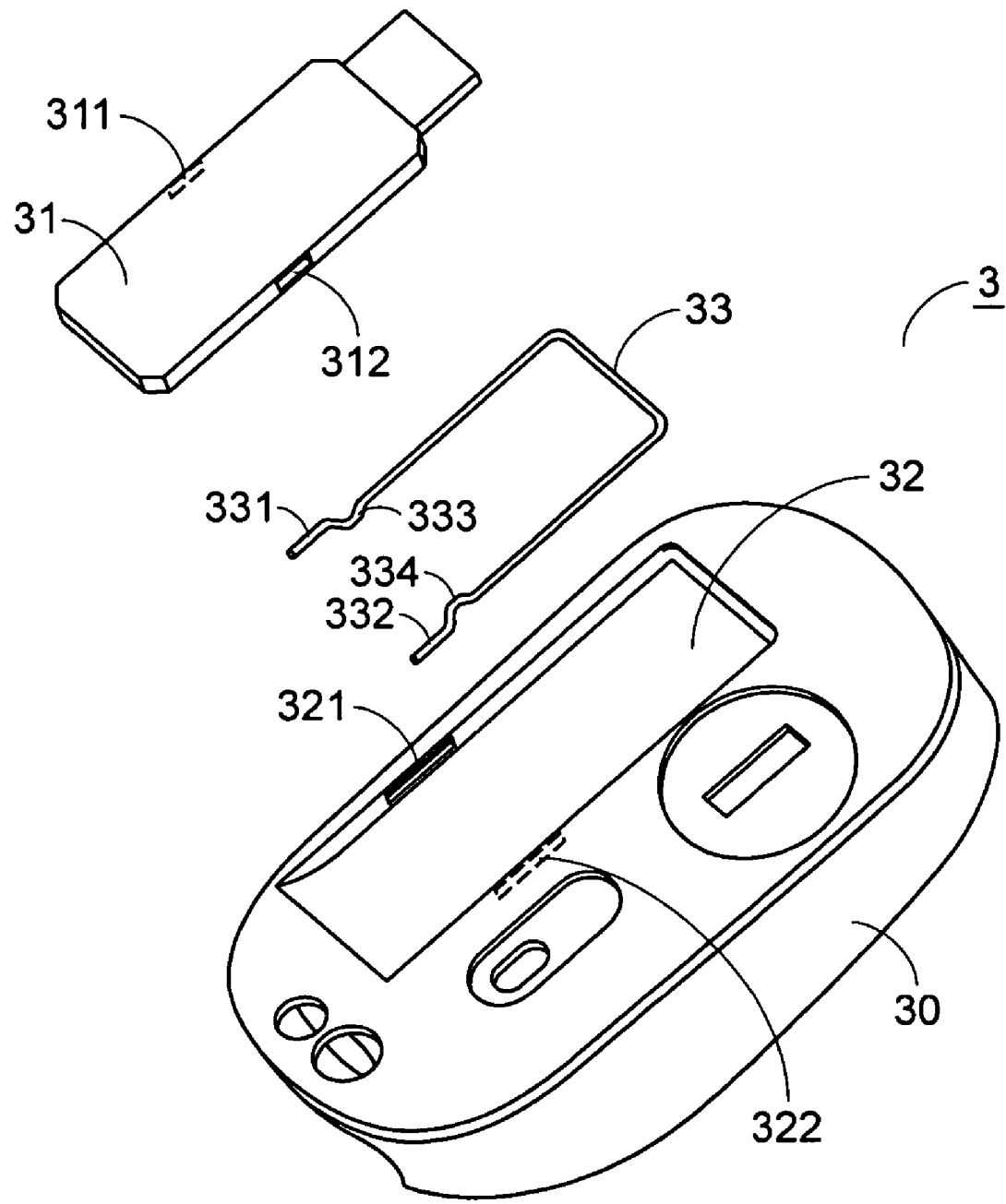
FIG. 2(a) is an exploded view of a wireless cursor control device according to a first preferred embodiment of the present invention.

Referring to FIG. 2(a), an exploded view of a wireless cursor control device according to a preferred embodiment of the present invention is illustrated. In this embodiment, the wireless cursor control device is a wireless mouse 3 applicable to a personal computer or a notebook computer. The wireless mouse 3 as shown in FIG. 2(a) comprises a main body 30, a wireless signal receiver 31, a storing portion 32 and a supporting member 33. If the wireless signal receiver 31 is plugged or swapped in a USB port (not shown) of a host computer, the signals generated from the main body 31 can be transmitted to the host computer via the wireless signal receiver 31. According to some major features of the present invention, the storing portion 32 and the supporting member 33 are used for storing the wireless signal receiver 31 facilitating fixing the wireless signal receiver 31, respectively. The operation principle of the present invention will be illustrated as follows in more details.

Figure 2B:
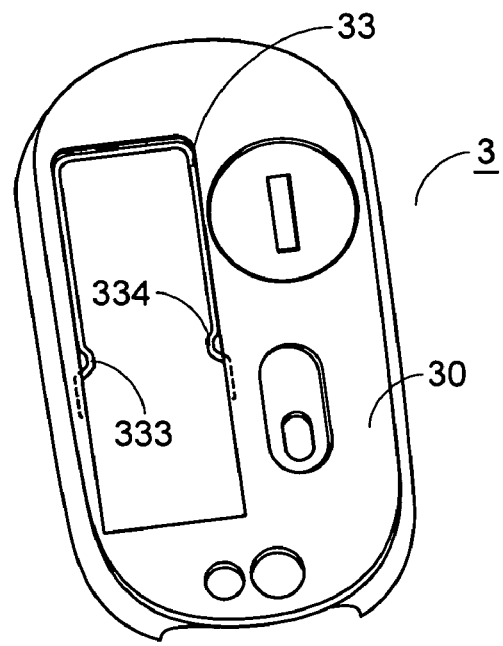
FIG. 2(b) is a schematic view illustrating that the supporting member is coupled with the storing portion according to the first preferred embodiment of the present invention.

Please refer to FIG. 2(b), which is a schematic view illustrating that the supporting member 33 is coupled with the storing portion 32. The dimension of the wireless signal receiver 31 conforms to the storing portion 32. As shown in FIGS. 2(a) and 2(b), the storing portion 32 further comprises a first indentation structure 321 and a second indentation structure 322 in the sidewalls thereof. In this embodiment, the supporting member 33 is a resilient supporting rod produced from stainless steel. The resilient supporting rod 33 is deformed and compressed in response to an external force, and returns to its original shape due to a restoring force generated from the compressed resilient supporting rod 33. The first part 331 and the second part 332 of the resilient supporting rod 33 are engaged with the first indentation structure 321 and the second indentation structure 322, respectively. In addition, due to the restoring force generated from the compressed resilient supporting rod 33, the resilient supporting rod 33 is firmly secured to the storing portion 32 when the first part 331 and the second part 332 of the resilient supporting rod 33 are engaged with the first indentation structure 321 and the second indentation structure 322, respectively.

Figure 2C:
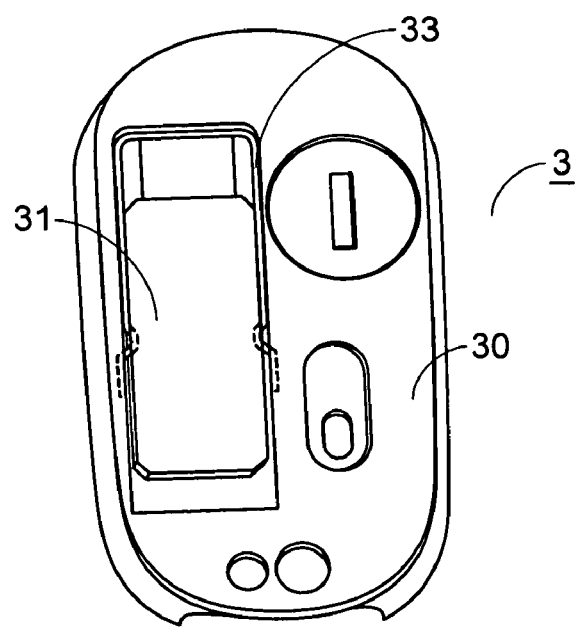
FIG. 2(c) is a schematic view illustrating that the wireless signal receiver is completely accommodated within the storing portion according to the first preferred embodiment of the present invention.

After the resilient supporting rod 33 is secured to the storing portion 32, the wireless signal receiver 31 can be accommodated within the storing portion 32 as shown in FIG. 2(c). During the wireless signal receiver 31 is inserted into the storing portion 32, the wireless signal receiver 31 may be sustained against a first protrusion structure 333 and a second protrusion structure 334 of the resilient supporting rod 33. Since the wireless signal receiver 31 is supported by the first protrusion structure 333 and a second protrusion structure 334 of the resilient supporting rod 33, the wireless signal receiver 31 is securely positioned within the storing portion 32 without loosening or falling off.

In the above embodiment, the wireless mouse 3 is characterized in that the first protrusion structure 333 and the second protrusion structure 334 of the resilient supporting rod 33 is sustained against the wireless signal receiver 31 after the resilient supporting rod 33 is secured to the storing portion 32. Alternatively, the bilateral sides of the wireless signal receiver 31 may include a first notch 311 and a second notch 312 to be engaged with the first protrusion structure 333 and the second protrusion structure 334 of the resilient supporting rod 33, thereby facilitating securely positioning the wireless signal receiver 31 within the storing portion 32.

Figure 3A:
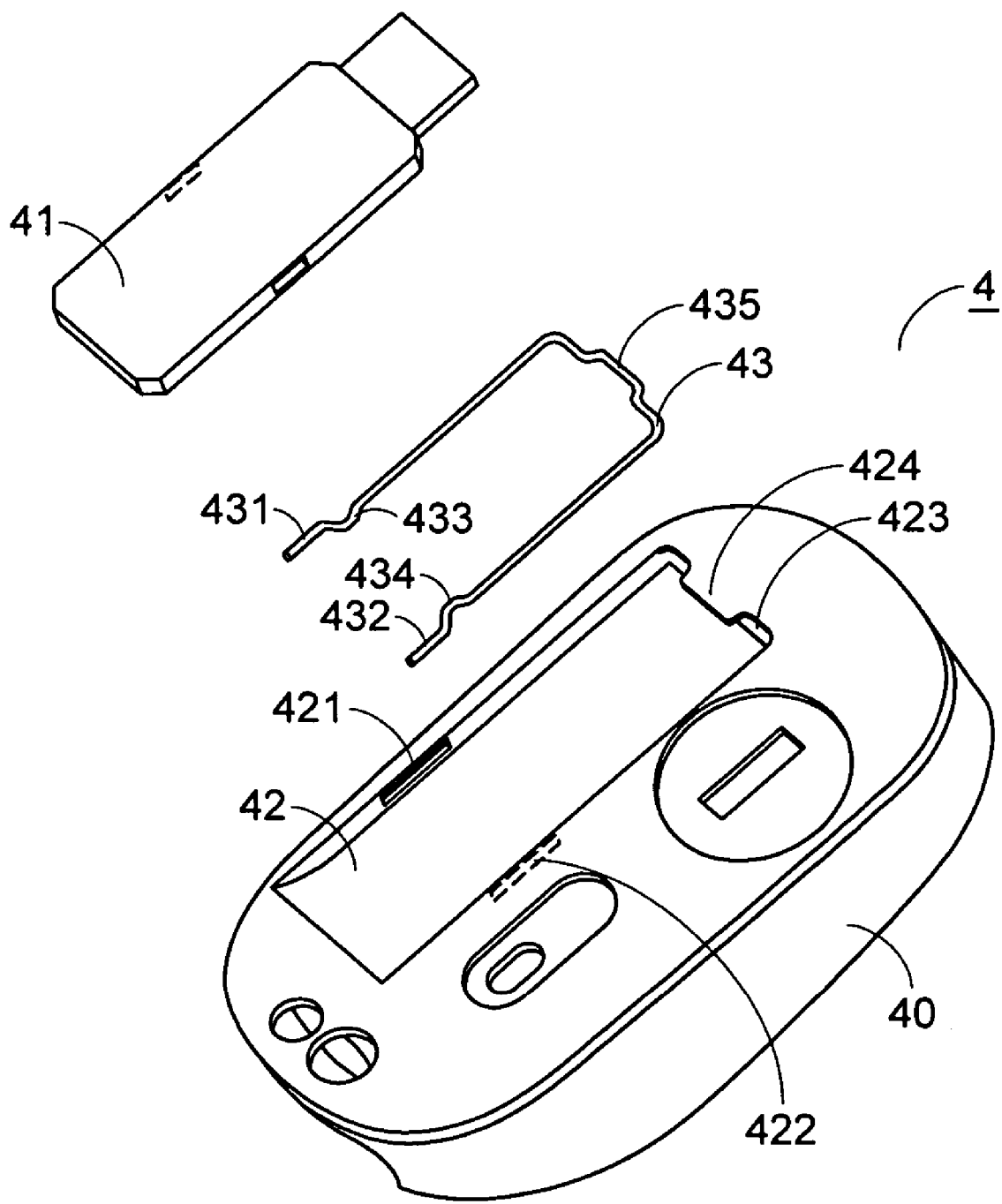
FIG. 3(a) is an exploded view of a wireless cursor control device according to a second preferred embodiment of the present invention.
Figure 3B:
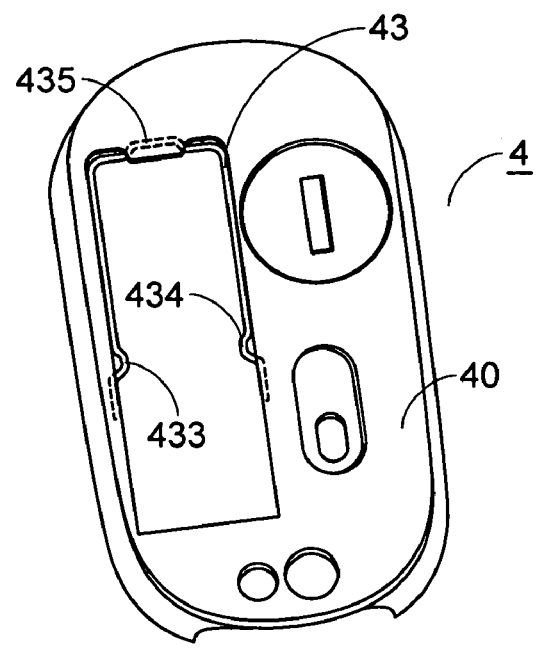
FIG. 3(b) is a schematic view illustrating that the supporting member is coupled with the storing portion according to the second preferred embodiment of the present invention.
Figure 3C:
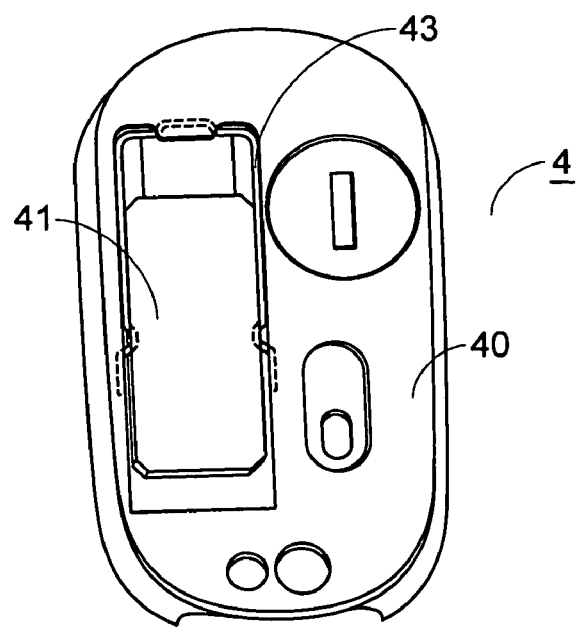
FIG. 3(c) is a schematic view illustrating that the wireless signal receiver is completely accommodated within the storing portion according to the second preferred embodiment of the present invention.

A further embodiment of a wireless mouse is illustrated in FIG. 3(a). In this embodiment, the wireless mouse 4 as shown in FIG. 3(a) comprises a main body 40, a wireless signal receiver 41, a storing portion 42 and a supporting member 43. As shown in FIGS. 3(a) and 3(b), the storing portion 42 comprises a first indentation structure 421 and a second indentation structure 422 in the sidewalls thereof. In addition, the storing portion 42 comprises a third indentation structure 423 and a roof structure 424 at the topside thereof. Likewise, the supporting member 43 is a resilient supporting rod having a first part 431 and a second part 432 engaged with the first indentation structure 421 and the second indentation structure 422 of the storing portion 42, respectively. The resilient supporting rod 43 further comprises a first protrusion structure 433, a second protrusion structure 434 and a third protrusion structure 435. The third protrusion structure 435 is engaged with the third indentation structure 423. After the resilient supporting rod 43 is secured to the storing portion 42, the wireless signal receiver 41 can be accommodated within the storing portion 42 as shown in FIG. 3(c). During the wireless signal receiver 41 is inserted into the storing portion 42, the wireless signal receiver 41 may be sustained against the first protrusion structure 433 and the second protrusion structure 434 of the resilient supporting rod 43. Since the wireless signal receiver 41 is supported by the first protrusion structure 433 and the second protrusion structure 434 of the resilient supporting rod 43, wireless signal receiver 41 is securely positioned within the storing portion 42 without loosening or falling off. Moreover, the roof structure 424 may facilitate supporting the wireless signal receiver 41 when the wireless signal receiver 41 is accommodated within the storing portion 42. By the way, some operation principles are similar to those described in FIG. 2, and are not to be redundantly described herein.

Figure 4A:
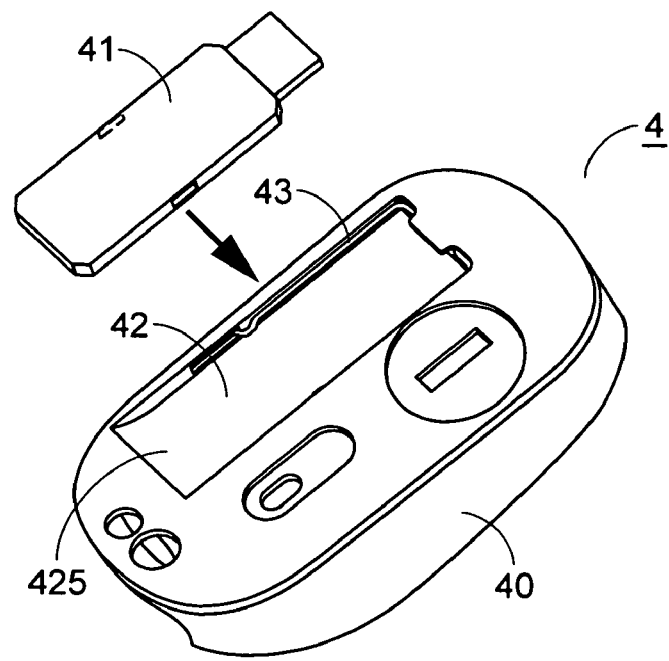
FIGS. 4(a) and 4(b) are schematic views illustrating two approaches of inserting the wireless signal receiver into the storing portion.
Figure 4B:
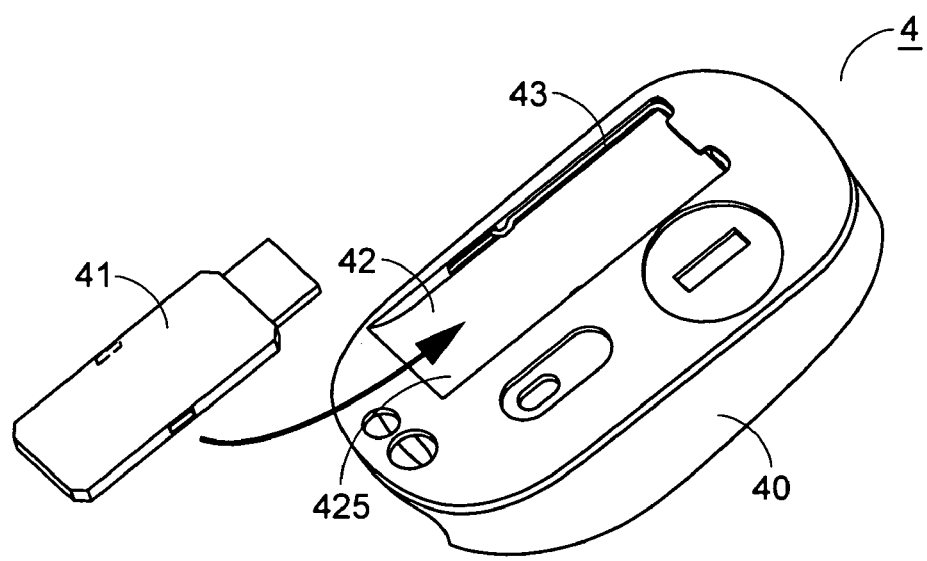

Referring to FIGS. 4(a) and 4(b), two approaches of inserting the wireless signal receiver 41 into the storing portion 42 are illustrated. In FIG. 4(a), the wireless signal receiver 41 is inserted into the storing portion 42 by depressing the wireless signal receiver 41. On the other hand, as shown in FIG. 4(b), since the storing portion 42 has an inclined plane 425 and the length of the storing portion 42 is greater than that of the wireless signal receiver 41, the wireless signal receiver 41 may be slid into the storing portion 42 through the inclined plane 425. Therefore, the wireless signal receiver 41 will be easily stored within the storing portion 42 by the depressing or sliding approach. By the way, a remaining space generated when the wireless signal receiver 41 is stored within the storing portion 42 facilitates a user to withdraw the wireless signal receiver 41 from the storing portion 42.

From the above description, the storing portion and the supporting member of the wireless mouse cooperatively facilitate storing and fixing the wireless signal receiver within the storing portion. In addition since the supporting member is resilient and made of stainless steel or other flexible material, the life of using the supporting member will be extended if the process of removing/inserting the wireless signal receiver from/into the storing portion is repeatedly done for a long term. Accordingly, the disadvantage of allowing the wireless signal receiver to be interference fitted into the storing portion in the prior art is overcome.

The present invention is illustrated by referring to a wireless mouse. Nevertheless, the present invention can be applied to other computer's wireless peripheral device having the main body and the wireless signal receiver similar to the wireless mouse of the present invention, for example, a wireless keyboard or a wireless joystick.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless cursor control device for use with a computer system, comprising:
   a main body for generating a wireless signal to control a cursor of said computer system;
   a wireless signal receiver for receiving said wireless signal;
   a storing portion disposed in said main body for accommodating said wireless signal receiver, wherein said storing portion comprises a first indentation structure and a second indentation structure in the bilateral side thereof and a third indentation structure and a roof structure above said third indentation structure for facilitating positioning said wireless signal receiver within said storing portion;
   a supporting member having a first part and a second part to be respectively engaged with said first indentation structure and said second indentation structure according to a restoring force per se, and comprising a first protrusion structure and a second protrusion structure to be sustained against said wireless signal receiver and a third protrusion structure to be engaged with said third indentation structure when said first part and said second part of said supporting member are engaged with said first indentation structure and said second indentation structure, respectively.

2. The wireless cursor control device according to claim 1 wherein said main body is a main body of a wireless mouse, and said computer system is selected from one of a personal computer and a notebook computer.

3. The wireless cursor control device according to claim 1 wherein said wireless signal receiver is swappable to be electrically connected to said computer system via a universal serial bus port.

4. The wireless cursor control device according to claim 1 wherein said wireless signal receiver further comprises a first notch and a second notch to be engaged with said first protrusion structure and said second protrusion structure of said supporting member.

5. The wireless cursor control device according to claim 1 wherein said supporting member is a resilient supporting rod produced from stainless steel, so that said first part and said second part of said resilient supporting rod are respectively engaged with said first indentation structure and said second indentation structure according to a restoring force per se.

6. The wireless cursor control device according to claim 1 wherein said wireless signal receiver is stored within said storing portion by a depressing approach and said first protrusion structure and said second protrusion structure of said supporting member are sustained against said wireless signal receiver after said supporting member is engaged within said storing portion, wherein the length of said storing portion is slightly greater than that of said wireless signal receiver, and a remaining space generated when said wireless signal receiver is stored within said storing portion facilitates a user to withdraw said wireless signal receiver from said storing portion.

7. The wireless cursor control device according to claim 1 wherein said storing portion has an inclined plane and the length of said storing portion is slightly greater than that of said wireless signal receiver, so that said wireless signal receiver is slidable to be stored within said storing portion and said first protrusion structure and said second protrusion structure of said supporting.

* * * * *